June 12, 1956 W. G. PFANN 2,750,544

SILICON TRANSLATING DEVICES AND METHODS OF MANUFACTURE

Filed Jan. 11, 1950

INVENTOR
W. G. PFANN
BY
ATTORNEY

United States Patent Office 2,750,544
Patented June 12, 1956

2,750,544

SILICON TRANSLATING DEVICES AND METHODS OF MANUFACTURE

William G. Pfann, Chatham, N. J., assignor to Bell Telephone Laboratories, Incorporated, New York, N. Y., a corporation of New York Application January 11, 1950, Serial No. 137,906

10 Claims. (Cl. 317—240)

This invention relates to semiconductor circuit elements and more particularly to semiconductor translating devices of silicon.

Such translating devices including a body of silicon and two or more contacts to the body are known as indicated by, for example, Patent 2,469,569, granted May 10, 1949, to R. S. Ohl and "Crystal Rectifiers" by H. C. Torrey and C. A. Whitmer. However, the preparation of such devices has involved, generally, special compositions and treatments of the semiconductive body, which treatments entailed considerable time expenditure and detailed and close controls.

An object of this invention is to facilitate the manufacture of silicon translating devices.

Another object of this invention is to permanently alter the electrical characteristics of a surface region in a silicon body and improve the translating characteristics of such a region.

An additional object of this invention is to facilitate the manufacture of negative resistance elements.

Another object of this invention is to simplify the treatment of semiconductor elements requisite to realize negative resistance characteristics in devices including such elements.

A further object is to improve the characteristics of silicon negative resistance devices.

A feature of this invention resides in permanently altering the electrical characteristics of a region adjacent the surface of a silicon body by bombarding that surface with electrically charged particles.

In accordance with another feature of the present invention, a slab of P-type high purity silicon cut from an ingot prepared by fusing high purity silicon powder, which may or may not contain an acceptor impurity, is mounted a short distance from an electrode and a potential sufficient to create a glow discharge is applied between the silicon and the electrode. The glow discharge is maintained for a period of the order of five seconds or more after which the potential is removed and a limited area contact is made to the area on which the glow discharge has fallen. The resulting device exhibits high resistance characteristics and operates in a relatively high frequency range.

Another feature of this invention resides in subjecting a silicon negative resistance which has been treated with a glow discharge to a stabilizing treatment comprising biasing the unit beyond its peak voltage and placing a condenser across it to cause oscillations to occur.

It is to be understood that the term "negative resistance" as employed in the specification and claims applies to the incremental resistance or the ratio of the increment electromotive force to the increment current which in the devices under consideration becomes negative under certain conditions so that the current rises relatively rapidly and the potential difference across the device falls. It is in the region where the increment current is positive while the increment potential is negative that the incremental resistance is negative and the term "negative resistance" applies.

The above-mentioned and other objects and features of this invention will be more clearly and fully understood from the following description taken in connection with the appended drawing in which.

The initial step in producing negative resistance devices in accordance with this invention involves the preparation of the material from which the wafers have been cut. Unlike previous silicon negative resistances it has been found that the characteristics of the final units do not depend to any great extent upon the material. Silicon supplied by the Electrometallurgical Company of 99.85 per cent purity containing approximately .06 per cent oxygen, .02 per cent carbon, .03 per cent iron, .02 percent aluminum, .01 per cent phosphorous and traces of calcium, manganese, magnesium, hydrogen and nitrogen, high purity silicon supplied by E. I. du Pont de Nemours Company, and silicon which has been doped with acceptor impurities such as that containing .01 per cent boron have all been found to give about the same shape of characteristic. The peak voltages of the material vary somewhat with its composition, that containing .01 per cent boron having peak voltages between 25 and 40 volts while the high purity material has a peak voltage of the order of 90 volts.

One method of preparing the silicon material, which is received in granular form, is to place it in a silica crucible, which is surrounded by a graphite heater in an induction furnace, the atmosphere of which is non-oxidizing, and heat it to about 1410° C. by slowly raising the temperature while a stream of helium, nitrogen or hydrogen is passed through the furnace. The melt is then raised to about 1600° C. and is slowly cooled to 1100° or 1200° C. so that the material progressively solidifies from the top of the ingot. As a result of this cooling, a higher impurity concentration occurs in the lower portion of the ingot which, therefore, is sometimes of N-type material. Slabs of P-type material of 1- to 2-millimeter thickness are then cut from the ingot and are ground on their major surfaces. One of these surfaces may then be subjected to an optical polish although this does not appear to be necessary to obtain negative resistance characteristics. The major surface which is to be secured to a supporting back electrode is plated, as with nickel or rhodium, and the slab is cut into sections of a size suitable for the device in which they are to be used, for example, 1.5 millimeters on a side.

Figure 1:
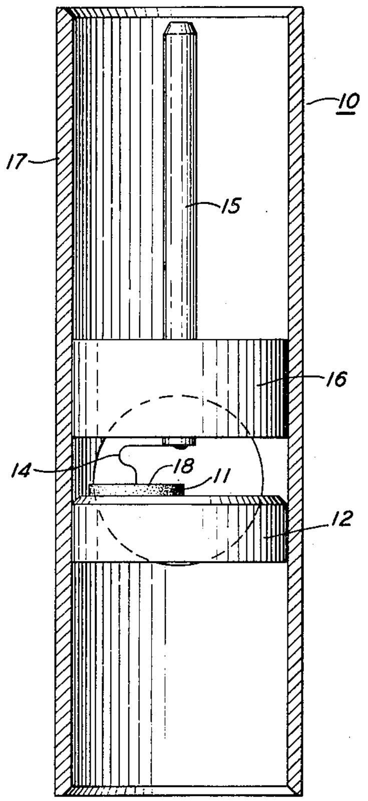
Fig. 1 is an elevational view of a negative resistance unit constructed in accordance with this invention with a portion of the casing cut away to more clearly show the structural relationship of the elements.
Figure 2:
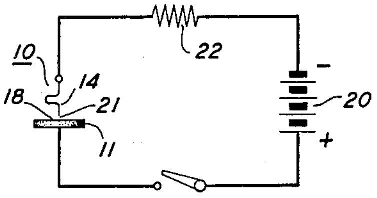
Fig. 2 illustrates a circuit by which the glow discharge treatment is accomplished.

The sections or wafers are now ready to be treated to produce their negative resistance characteristics. When the negative resistance device 10 is of the type shown in Fig. 1, this treatment can be conveniently accomplished after it has been partly assembled. In such case, the plated surface of the silicon wafer 11 is soldered to the conductive plug 12, of brass or other suitable material, and a limited area contact in the form of a .002-inch spring wire 14 of tungsten, platinum-5 per cent ruthenium or the like contact materials, is spot welded to a nickel pin 15 which is molded in the insulating plug 16. These two subassemblies are forced into a metal sleeve casing 17, which may be of brass, and advanced until the end of the spring wire is within about .001 to .0001 inch of the surface 18 of the silicon. The device is then connected in a circuit of the type shown in Fig. 2 for treatment, after which the contact is advanced to engage the treated silicon surface and caused to deflect about .001 inch thereby insuring a good contact which is mechanically stable.

Negative resistance effects in the silicon are attained by creating an electrical discharge between the silicon and an electrode spaced slightly therefrom. This is accomplished by applying a constant potential, advantageously between 400 and 500 volts silicon positive, from the source 20 across the gap 21 with a series resistance 22 of .1 to 1 megohm in the circuit to limit the current and thereby prevent damage to the unit. These circuit parameters are such that at the separation between electrode 14 and body 11 suggested above, the gap breaks down and a stable electrical discharge appears between the electrode and the silicon. If the circuit is not interrupted, this discharge, which bathes the electrode in a light purple, pink, or blue glow, depending on the atmosphere, will continue for from a few seconds to several minutes. Atmospheres of air, nitrogen and hydrogen at atmospheric pressure have been used in the production of successful units.

As a result of the discharge, the region of the silicon beneath the electrode, in the case of a wire electrode this region is on the order of .12 to .25 millimeter in diameter, becomes discolored and coated with a layer of film which has insulating or semiconductive characteristics. This layer builds up with time, increasing the resistance of the surface to such a degree that it is insulating after long time discharges. Therefore, it is desirable to limit the period to about a minute. Negative resistance characteristics have been obtained from a discharge period as short as 5 seconds.

While the action of the glow discharge in producing negative resistance effects has not been determined with certainty, it is believed, in view of the complex ionization which occurs in the gap between the silicon and the electrode, resulting in electrons and both positive and negative ions, and in view of the successful production of negative resistances when the silicon body is negative during treatment, that bombardment of the silicon surface by electrically charged particles causes the change in its characteristics. The negative particles are the bombarding media when the silicon is positive and the positive particles when it is negative.

Figure 3:
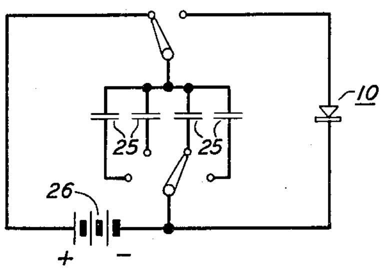
Fig. 3 depicts a stabilizing circuit for negative resistances treated in the circuit of Fig. 2.

Improvement of the stability of the device can be attained by a condenser-oscillation or condenser-discharge treatment in the circuit shown in Fig. 3. In that circuit, a bank of condensers 25 of various values are arranged so that they can be selectively charged beyond the peak voltage of the unit being treated by a battery 26, a selector switch 27 being employed to determine which condenser is to be charged, and then connected to and discharged through the negative resistance 10 thereby setting up electrical oscillations in the circuit and through the unit. Although the capacitances do not appear critical, most effective results have been obtained using values between .0005 and .005 microfarad. It is believed that this discharge further modifies the contact between the point and the silicon by a heating or burning action. Another electrical treatment for stabilizing these negative resistance units can be effected by biasing the unit to be treated beyond its peak voltage and placing a condenser across it. This produces sustained oscillations, in contrast with the transient ones formed by condenser discharge.

Figure 4:
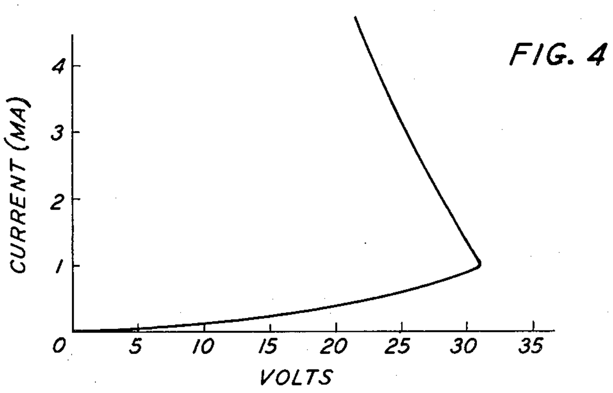
Fig. 4 is a characteristic of a typical unit constructed in accordance with this invention.

The resulting unit is stable mechanically and as may be seen from the curve of Fig. 4 can be operated over a wide range of voltage in the negative resistance range, some units being operable at voltages as low as two-thirds the maximum voltage without damage. The units are symmetrical in their operating characteristics, and though their forward and reverse characteristics are almost identical, they have been found to operate for considerably longer periods when biased silicon negative. A further advantageous electrical property of these units is their ability to operate at frequencies in the order of 100 kilocycles.

While it is to be understood that the glow discharge treatment may take place between silicon and a number of forms of electrodes, it has been found that limited area treatments such as might be employed on a device having two or more closely spaced limited area contacts can readily be controlled by use of the above-described technique. In such a treatment, the treated portion may be confined to a small area under the contact and the contact advanced to the surface immediately after treatment with a minimum chance for error in the alignment of contact and special surface.

Reference is made to the copending application of R. S. Ohl, Serial No. 141,512 filed January 31, 1950, directed to related subject matter.

What is claimed is:

1. The method of manufacturing an electrical translating device which comprises bombarding a body of silicon with electrically charged particles, interrupting said bombardment, and mounting a contact on that portion of the body subjected to said bombardment.

2. The method of manufacturing an electrical translating device which comprises creating a glow discharge between a body of silicon and an electrode, interrupting said glow discharge, and mounting a limited area contact on the portion of the body contacted by said glow discharge.

3. The method of manufacturing an electrical translating device which comprises sustaining a glow discharge at atmospheric pressure between a body of silicon and an electrode, interrupting said glow discharge, mounting a limited area contact on the portion of the body contacted by said glow discharge, and discharging a condenser biased beyond the peak voltage of the device across the contact and the silicon body.

4. The method of manufacturing an electrical translating device which comprises mounting a silicon body in a casing, mounting a limited area contact in said casing in spaced relationship to said body, producing a glow discharge between said contact and said body, interrupting said glow discharge, and advancing said contact in said casing to engage said body on the surface contacted by said glow discharge.

5. The method of manufacturing a negative resistance device which comprises polishing a surface of a silicon body, producing a glow discharge in air at atmospheric pressure between the body and a spaced electrode, interrupting said discharge and mounting a limited area contact on the portion of the body contacted by said glow discharge.

6. The method of manufacturing a negative resistance device which comprises polishing a surface of a silicon body, mounting an electrode in spaced relationship to said surface and within of the order of .001 inch thereof, producing a glow discharge at atmospheric pressure between said surface and said electrode, interrupting said discharge, mounting a limited area contact on the portion of said surface contacted by said glow discharge, and setting up electrical oscillations across said contact and said body.

7. An electrical circuit element comprising a body of silicon, a film on one surface of said body formed by a glow discharge between said body and a spaced electrode, a contact to said body, and a contact engaging said film.

8. An electrical circuit element comprising a body of silicon, a film on one surface of said body formed by a glow discharge between said body and a spaced electrode, an ohmic contact engaging said body on a portion spaced from said film, and a limited area contact engaging said film.

9. An electrical translating device comprising a body of silicon, an integral surface layer on said body having electrical characteristics different from those of said body produced by an ionic bombardment thereof, an ohmic connection to said body, and a contact engaging said layer.

10. The method of manufacturing an electrical translating device which comprises bombarding a body of silicon with electrically charged particles, interrupting said bombardment, and mounting a limited area contact on the portion of the body subjected to said bombardment.

References Cited in the file of this patent

UNITED STATES PATENTS

| | | |
|---|---|---|
| 2,163,393 | Brunke et al. | June 20, 1939 |
| 2,293,348 | Fink et al. | Aug. 18, 1942 |
| 2,373,639 | Turner | Apr. 10, 1945 |
| 2,563,503 | Wallace | Aug. 7, 1951 |

FOREIGN PATENTS

| | | |
|---|---|---|
| 497,034 | Great Britain | Dec. 12, 1938 |